(12) United States Patent
Mykulowycz et al.

(10) Patent No.: US 11,859,261 B2
(45) Date of Patent: Jan. 2, 2024

(54) HOMOGENIZING HETEROGENEOUS FOILS FOR LIGHT ALLOY METAL PARTS

(71) Applicant: Alloy Enterprises, Inc., Burlington, MA (US)

(72) Inventors: Nicholas Mykulowycz, Boxford, MA (US); Alison Forsyth, Somerville, MA (US); Alan Lai, Cambridge, MA (US); Lyle Cheatham, Marblehead, MA (US)

(73) Assignee: Alloy Enterprises, Inc., Burlington, MA (US)

( * ) Notice: Subject to any disclaimer, the term of this patent is extended or adjusted under 35 U.S.C. 154(b) by 0 days.

(21) Appl. No.: 18/120,282

(22) Filed: Mar. 10, 2023

(65) Prior Publication Data

US 2023/0212707 A1    Jul. 6, 2023

Related U.S. Application Data

(63) Continuation of application No. PCT/US2021/065196, filed on Dec. 27, 2021, which is a continuation-in-part of application No. PCT/US2021/030879, filed on May 5, 2021, and a continuation-in-part of application No. PCT/US2021/036770, filed on Jun. 10, 2021.

(60) Provisional application No. 63/131,285, filed on Dec. 28, 2020, provisional application No. 63/257,091, filed on Oct. 18, 2021.

(51) Int. Cl.
| | |
|---|---|
| C23C 24/10 | (2006.01) |
| C21D 9/46 | (2006.01) |
| C22C 1/04 | (2023.01) |
| B23K 20/00 | (2006.01) |

(52) U.S. Cl.
CPC .......... *C21D 9/46* (2013.01); *C22C 1/04* (2013.01); *B23K 20/002* (2013.01)

(58) Field of Classification Search
None
See application file for complete search history.

(56) References Cited

U.S. PATENT DOCUMENTS

| | | | |
|---|---|---|---|
| 5,876,550 | A | 3/1999 | Feygin |
| 9,567,687 | B2 | 2/2017 | Zhang et al. |
| 10,946,480 | B2 | 3/2021 | Mellor et al. |
| 2005/0161146 | A1 | 7/2005 | Graf |
| 2015/0367446 | A1 | 12/2015 | Buller et al. |
| 2016/0009062 | A1 | 1/2016 | Keenan et al. |

(Continued)

FOREIGN PATENT DOCUMENTS

| | | |
|---|---|---|
| EP | 1017532 A1 | 7/2000 |
| KR | 101616499 B1 | 4/2016 |
| WO | 2021126271 A1 | 6/2021 |

OTHER PUBLICATIONS

International Search Report for PCT/US2021/065196, dated Jun. 2, 2022, 4 pages.

(Continued)

*Primary Examiner* — Anthony M Liang
(74) *Attorney, Agent, or Firm* — Danielson Legal LLC

(57) ABSTRACT

A method for the manufacturing of an object. The method includes receiving a desired alloy composition for the object, depositing a plurality of foils in a stack to form the object, applying heat to the stack at a first temperature to bond the plurality of foils to each other, and applying heat to the stack at a second temperature to homogenize the composition of the stack. The homogenized stack has the desired alloy composition.

17 Claims, 11 Drawing Sheets

(56) References Cited

U.S. PATENT DOCUMENTS

2019/0054685 A1     2/2019   Zimmer
2020/0031042 A1     1/2020   Graham et al.

OTHER PUBLICATIONS

Written Opinion for PCT/US2021/065196, dated Jun. 2, 2022, 4 pages.

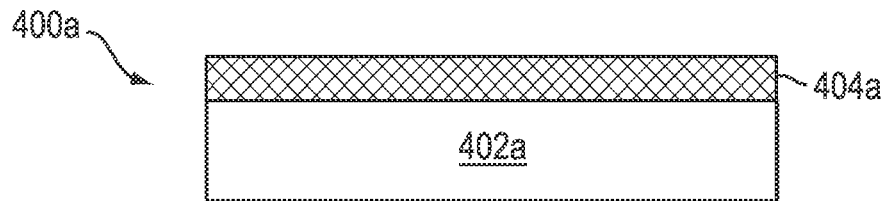
FIG. 4A
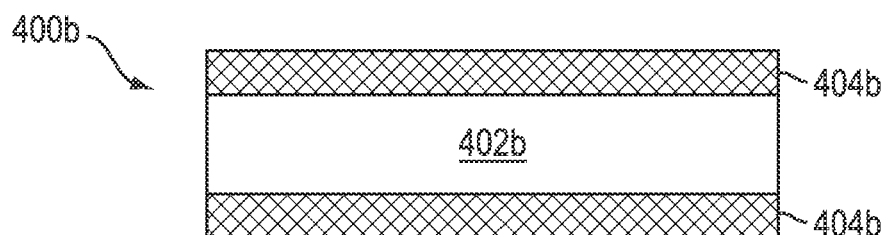
FIG. 4B
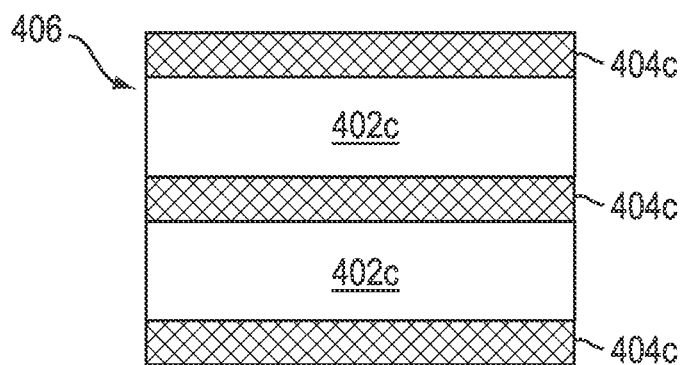 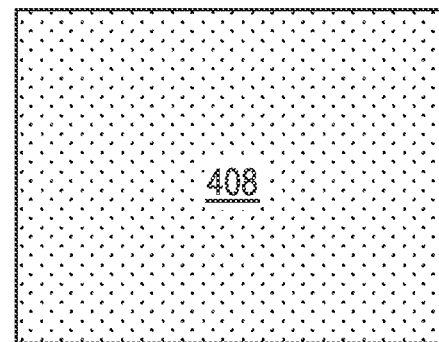
FIG. 4C  FIG. 4D

HOMOGENIZING HETEROGENEOUS FOILS FOR LIGHT ALLOY METAL PARTS

CROSS REFERENCE TO RELATED APPLICATIONS

The present application is a continuation of International (PCT) Patent Application No. PCT/US2021/065196, filed internationally on Dec. 27, 2021, and claims the benefit of and priority to U.S. provisional applications Nos. 63/131,285 and 63/257,091, filed on Dec. 28, 2020, and Oct. 18, 2021, respectively, and International (PCT) Patent Applications Nos. PCT/US2021/030879 and PCT/US2021/036770, filed internationally on May 5, 2021, and Jun. 10, 2021, respectively, the entire disclosure of each of which is hereby incorporated by reference as if set forth in their entirety herein.

TECHNICAL FIELD

Embodiments described herein relate to methods and systems for fabricating an object and, more particularly but not exclusively, to methods and systems for manufacturing objects having a desired alloy composition from stacks of foils having compositions that differ from the desired alloy composition.

BACKGROUND

Laminated object manufacturing (LOM) techniques generally involve stacking multiple foils consisting of layers of at least two alloys and bonding the foils together to yield a solid object. Parts assembled via customary LOM techniques have different compositions in bonded regions between foils and in structural parts of foils, alternating throughout the bulk of the part. These composition gradients throughout the part may cause the mechanical properties of the composite LOM-assembled parts to not equal the properties predicted by the average composition of the alloy.

A need therefore exists for improved LOM techniques.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments relate to a method for the manufacturing of an object. The method includes receiving a desired alloy composition for the object; depositing a plurality of foils in a stack to form the object; applying heat to the stack at a first temperature to bond the plurality of foils to each other; and applying heat to the stack at a second temperature to homogenize the composition of the stack, wherein the homogenized stack has the desired alloy composition.

In some embodiments, the plurality of foils are patterned.

In some embodiments, the plurality of foils comprises foils having at least two different compositions.

In some embodiments, each foil comprises a plurality of layers. In some embodiments, each layer comprises an aluminum alloy, a magnesium alloy, or a titanium alloy. In some embodiments, the alloying material is aluminum, chromium, copper, lithium, magnesium, titanium, nickel, silicon, or zinc. In some embodiments, a first layer forms a core of the foil and a second layer forms a cladding of the foil.

In some embodiments, each foil is between 25 and 1000 micrometers in thickness.

In some embodiments, the second temperature is less than the melting points of the plurality of foils.

In some embodiments, the second temperature is approximately or less than the solidus temperature of the plurality of foils of the desired alloy composition.

In some embodiments, the first temperature and the second temperature are the same.

In some embodiments, the application of heat at the first temperature occurs in a first processing unit and the application of heat at the second temperature occurs in a second processing unit. In some embodiments, the stack is maintained at the first temperature during transfer from the first processing unit to the second processing unit.

In some embodiments, the method further includes quenching the stack after homogenization. In some embodiments, the quenching occurs in the same processing unit used for homogenizing the stack.

In some embodiments, the desired alloy composition is a homogenous composition that is non-identical to that of the plurality of foils.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

FIGS. 4A-D illustrate foils in various configurations in accordance with multiple embodiments;

DETAILED DESCRIPTION

Figure 1:
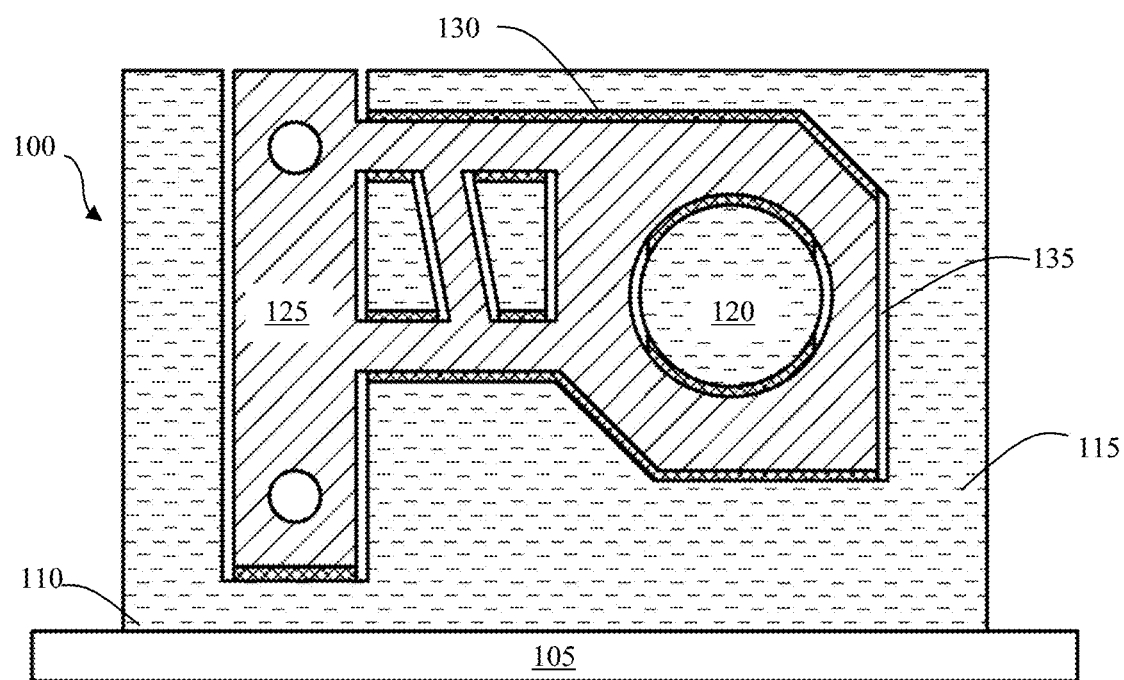
FIG. 1 depicts a side view cross section of a metal laminated object manufactured in accordance with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Embodiments of the present invention include methods used to homogenize the composition of light alloy laminated parts. These laminated parts may be the product of a LOM process. In some embodiments, the parts may comprise multiple foils bonded together through some method, with each foil comprising at least one core layer and at least one interlayer. In other embodiments, the parts may comprise multiple foils bonded together through some method, with alternating foils of a uniform core layer and a uniform interlayer. The process consists of applying heat for a predetermined processing time to promote solid-state diffusion of the alloying elements throughout the bulk of the part in some embodiments. Solid-state diffusion homogenizes the composition of alloying elements throughout the bulk of the part in order to improve the mechanical properties of the LOM-produced parts in some embodiments. In embodiments of this method, no appreciable quantity of material is added to the part.

In some embodiments, both the compositions and relative fractions of the component layers that make up the foils are selected so that the fully homogenized part has an average composition that corresponds to a target alloy. Two or more layers of different alloys that are combined and homogenized using this method may produce a third alloy that is determined by the composition and thicknesses of the component layers. In some embodiments, the target alloy has composition and material properties similar to a commonly manufactured, commercially-available aluminum alloy.

The term "foil" refers to the metallic sheet used to form each layer in a layer stack. The foil may comprise one or more sub-layers, of which there is at least one layer, and optionally some number of interlayers comprising a different metal alloy from the first layer. In some embodiments, a foil has a thickness in one dimension between 10 μm and 10 mm. In some embodiments, a foil has a thickness in one dimension between 25 μm and 1000 μm. In further embodiments, a foil may have a thickness in one dimension between 50 μm and 500 μm. In some embodiments, the foil may be patterned corresponding to the design of the object(s) and its support structure(s). In some embodiments, the foil may comprise at least one of Al, Sb, Ba, Be, Bi, B, Cd, Ca, C, Cr, Co, Cu, Gd, Ga, H, Fe, Pb, Li, Mg, Mn, Mo, Nd, Ni, Nb, N, O, Pd, P, K, S, Si, Ag, Na, Sr, S, Ta, Th, Sn, Ti, V, Y, Zn, Zr, or a rare earth metal. In some embodiments, the foil may comprise at least one of aluminum, magnesium, titanium, aluminum alloy, magnesium alloy, or titanium alloy.

The terms "core" or "core layer" refer to a foil or a portion of a foil that comprises the majority of a layer stack. The composition of the alloy used for the core layer material is described in terms of the primary alloying elements.

The term "interlayer" refers to the foil or the portion of the foil that allows adjacent foils to bond. In some embodiments, the interlayer may be on the outside of the foil, applied to at least one face of a core layer. In some embodiments, the thickness of the interlayer is less than the thickness of the core layer. The composition of the alloy used for the interlayer is described in terms of the primary alloying elements.

The terms "clad layer" or "cladding" refer to an interlayer material bonded to a core layer prior to the start of the bonding and homogenization process. In some embodiments, a thin interlayer of one composition roll bonded to a core layer would be described as a "clad foil."

A "layer stack" refers to at least two foils. A single foil may include at least one support region and at least one object region in some embodiments. "Support" refers to the non-object component of the foil that, when bonded together, forms a holder or jig that conforms to the object exterior and may be used in subsequent post-processing. This holder or jig, formed as a combination of multiple support regions, may be referred to as a "support section." The combination of object regions may be referred to as an "object section." The process of combining may be referred to as "joining."

The term "aluminum" refers to any material that comprises aluminum. For example, a material comprising aluminum may refer to a material of pure molecular aluminum, aluminum that is pure to a standard industrial grade, an alloy of aluminum and at least one other element, or any combination thereof. In the case where an alloy comprises a specific metal such as aluminum, at least the plurality of the alloy composition is the same specific metal. The secondary alloying elements present may be subsequently described.

Some embodiments herein relate to methods to manufacture metal objects from constituent metal layers with comparable mechanical properties. In some embodiments, these methods avoid the use of adhesives between layers and instead use high-strength metallic bonds between the constituent layers to form an object. For aluminum parts, some embodiments may use bonding methods such as diffusion bonding, transient liquid phase diffusion bonding, and/or brazing. Specific configurations of materials, such as alloy composition, alloy structure including composites of two or more sub-layers with distinct compositions, and process conditions, such as applied temperature and pressure, may yield strong metallic bonds with shorter and more robust processes useful for manufacturing aluminum parts.

In some embodiments, manufacturing methods described herein first receive a desired alloy composition for an object. These embodiments then apply heat to a stack of foils comprising at least one core layer and at least one interlayer to homogenize the composition of the stack. The resultant product is a homogenized object that has the desired alloy composition. The foils in the stack may be selected so that, e.g., one layer has a surplus of one element and an adjacent layer has a deficiency of the same element so that the resulting object has a desired proportion of the element. This may be true of a plurality of elements forming a desired composition for an object.

FIG. 1 depicts a side view cross section of a metal laminated object 100 manufactured in accordance with one embodiment. In some embodiments, the object 100 may be manufactured on a print bed 105. In some embodiments, a foil 110 may be deposited onto the print bed 105. In some embodiments, multiple foils may be deposited either directly onto the first foil 110 or may be later added on top of the first foil 110.

Figure 2:
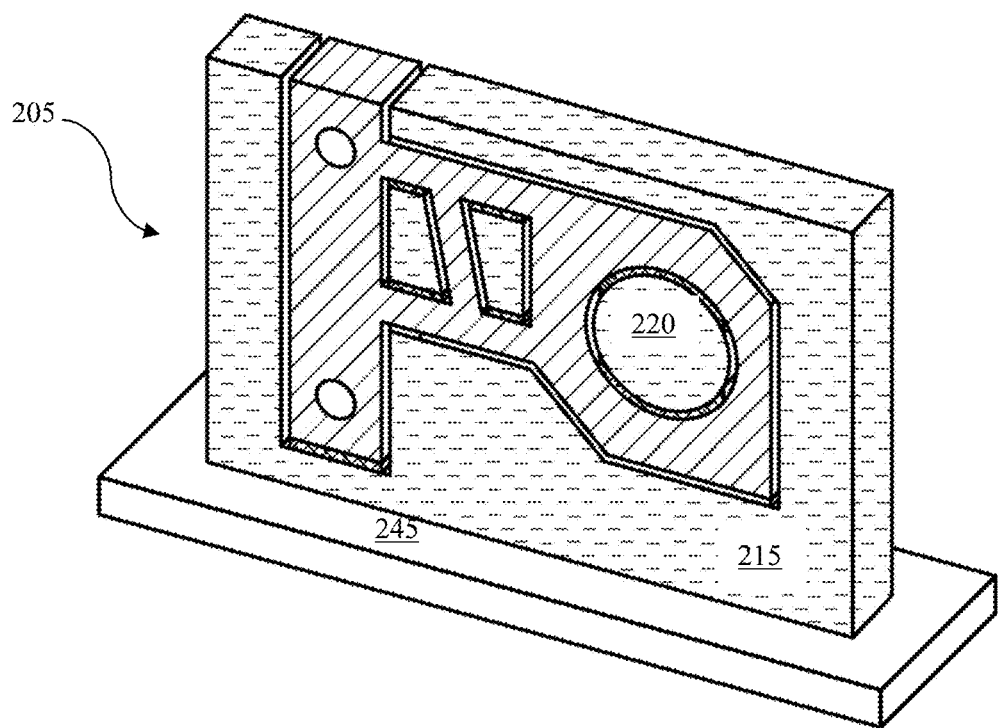
FIG. 2 depicts trimetric and object views of the metal laminated object of FIG. 1 in accordance with one embodiment.
Figure 2:
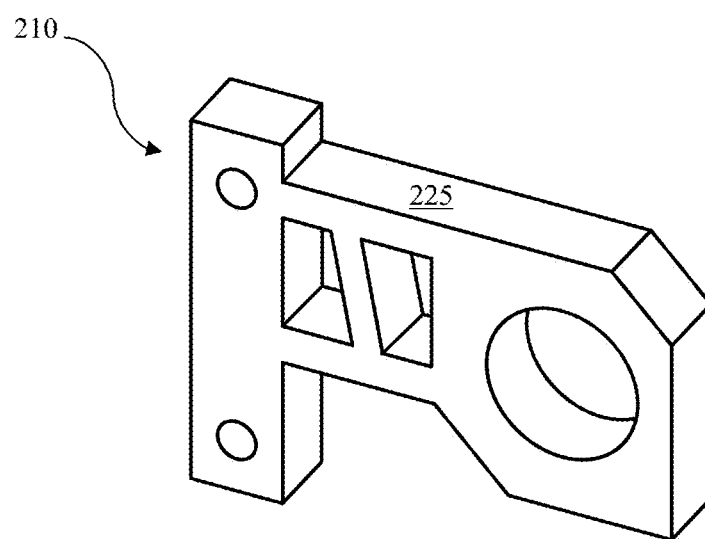

FIG. 2 depicts trimetric 205 and object 210 views of the metal laminated object of FIG. 1 in accordance with one embodiment. The object may be enclosed in support sections 215, 220 and, as explained in further detail below, those support sections 215, 220 may be removed after the object section 225 is formed to finalize the metal laminated object.

Figure 3:
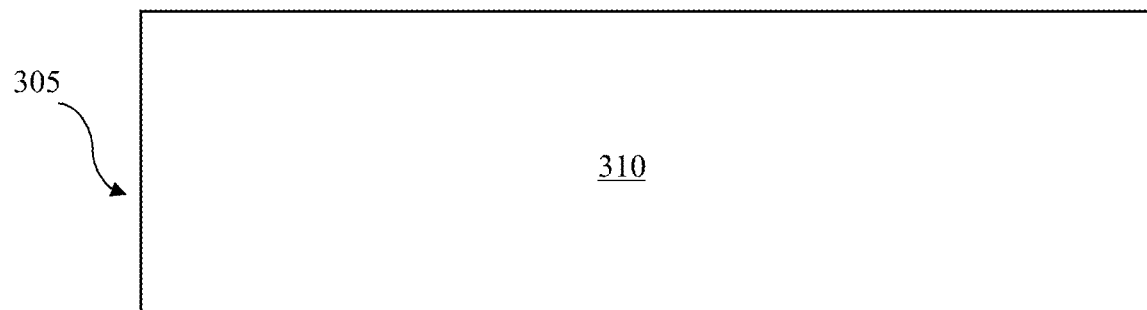
FIG. 3 depicts cross sections of individual foils in accordance with one embodiment.
Figure 3:
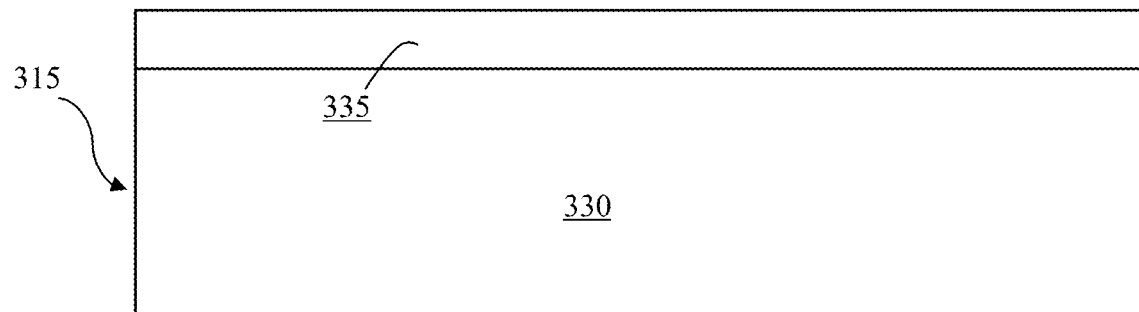
Figure 3:
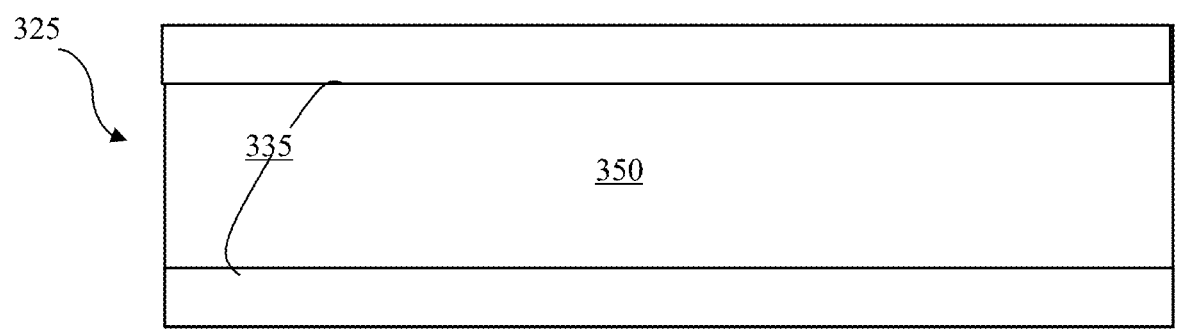

FIG. 3 depicts cross sections of individual foils 305, 315, 325 in accordance with one embodiment. In some embodiments, at least one foil in a stack of foils (not shown) may be comprised exclusively of a core layer 310. In some embodiments, a foil 315 may comprise a core layer 330 and a separate interlayer 335 on one surface. In some embodiments, the interlayer 335 may be on top of the core layer 330. In some embodiments, the interlayer 335 may be on the bottom of the core layer 330. In some embodiments, a foil 325 may comprise a core layer 350 and two interlayers 335 on either side of the foil.

In some embodiments, the core layer may comprise aluminum. In some embodiments, the core layer may be an aluminum alloy.

In some embodiments, the interlayer may comprise a metal or alloy having a lower melting point than the core layer. In some embodiments, the interlayer material may comprise at least one of aluminum, copper, chromium, iron, magnesium, manganese, silicon, titanium, and zinc. In some embodiments, the metallic elements may be present in a number of different combinations, each composition selected for a particular set of properties that matches its bonding method, such as surface oxide resistance, surface oxide disruption, optimal melting temperatures, and the properties of the liquid state such as wettability over the core layer. In some embodiments, the two interlayers may comprise different materials. In some embodiments, the two interlayers may be identical.

In some embodiments, the thickness for the interlayer may be 1-50% of the thickness of the core layer. In some embodiments, the thickness for the interlayer may be 0-5% of the thickness of the core layer 330. In some embodiments, the thickness of the interlayer for a single-clad foil may be 1-25% of the thickness of the core layer 330. In some embodiments, the thickness of the interlayer for a double-clad foil may be 2-50% of the thickness of the core layer.

In some embodiments, the thickness of the interlayer is less than the thickness of the core layer. In some embodiments, the total thickness of a foil is greater than 25 μm. In other embodiments, the total thickness of a foil is less than 1000 μm. The thicknesses of the core layer and interlayers, as well as the ratio of the core layer thickness to interlayer thickness, are variable and optimized to the specific bonding method in some embodiments.

In some embodiments, the specific composition of an interlayer is selected such that the interlayer material melts at a lower temperature than the core layer. In some embodiments, the interlayer material is selected to minimize the melting temperature. In some embodiments, the melting temperature of the interlayer material may be greater than 500° C. and less than 590° C. In some embodiments, the melting temperature of the interlayer material may be below 500° C. In a different subset of these embodiments, the melting temperature of the interlayer material may be below 490° C. In some embodiments, the ratio of interlayer material and core layer material and the compositions thereof are selected so the final mechanical properties of the object are that of a desired composition. In some embodiments where the interlayer component is a small fraction of the total foil, the desired composition may be within the tolerances of the composition of the core material.

In some embodiments, the composition of the foils in a stack are selected so that, once heated, the finished object has a desired composition. For example, if the finished object is to have a desired composition matching a particular alloy, the individual sheets may each have a surplus or a deficiency of various elements but, when heated, the finished object has a substantially homogenous composition matching the desired composition.

For example, FIG. 4A depicts a foil 400a in accordance with one embodiment. Foil 400a includes a single core layer 402a that is clad on one side with an interlayer 404a. FIG. 4B illustrates a foil 400b in accordance with another embodiment. Foil 400b includes a single core layer 402b that is cladded on both sides with an interlayer 404b.

The core layers 402a and 402b may comprise a majority of aluminum or magnesium. Additional alloying elements may be present such as, but not limited to, copper, silicon, zinc, or other material as discussed previously.

The interlayers 404a and 404b may comprise some combination of aluminum, copper, magnesium, silicon, and zinc, or other material as discussed previously. The interlayer(s) 404a and 404b may alternatively comprise a uniform layer of any single element in the foregoing list.

In some embodiments, an interlayer comprises between 1-50% of the total foil thickness. In some embodiments, such as those in which the interlayer comprises a single element, the interlayer may comprise a thin layer of less than 5% of the total foil thickness.

The specific compositions of the core layer or interlayer(s) may match the composition of commercially available aluminum alloys. For example, a core layer may comprise 2024, 5182, 6061, or another alloy. Custom alloys that largely match commercial alloy compositions but have either increased or decreased concentrations of one or more elements present in the interlayer(s) may also be employed. The interlayer(s) may comprise 2024, 4004, 5182, 6061, 7075, or another commercial aluminum alloy. Interlayers may also comprise custom alloys that match commercial alloy compositions, but may also have increased or decreased concentrations of one or more elements.

The compositions of the core layer and the interlayer(s) with respect to each other may vary. For example, in some embodiments, an element present in excess in an interlayer may be present in a lower concentration in the core layer to achieve a desired composition after homogenization.

Alternatively, an element present in excess in a core layer may be present in a lower concentration in the interlayer(s) to achieve a desired composition after homogenization. The relative thickness of the layers may also be selected so that the average composition of the alloy matches 2024, 6061, 7075, or another desired composition.

As another example, the core layer(s) may comprise a magnesium alloy with a high melting point. The interlayer(s) may comprise a low melting point magnesium alloy as well as custom alloys that have increased or decreased concentrations of the alloying elements. In some embodiments, the interlayer(s) may comprise an element that depresses the melting point of magnesium.

In operation, a user or system may provide a part to a heating environment such as a furnace. The furnace may apply heat to the part(s) to raise the temperature of the part(s) and maintain the temperature of the part(s) at a certain temperature or range of temperatures for a period of time. Specifically, the techniques in accordance with the embodiments herein may involve a bonding phase in which layers are heated and bonded together, and then a homogenization phase in which the bonded layers are heated to produce a homogenized product. The homogenized product may then be quenched.

In some embodiments, the bonded parts may be transferred to a separate furnace processing unit that performs the homogenization phase. The parts may be moved with a supporting structure, for example. In other embodiments, a chamber may protect the parts during movement to protect the surface from oxidation. In some embodiments, the chamber may be under vacuum, or be a shield gas chamber with an inert or non-oxidative gas present around the part. In some embodiments, these steps may further include a polishing step in which parts may be polished or otherwise modified prior to or after the homogenization process.

During the heating phase, the furnace may apply heat to the part(s) to increase its temperature up to the processing temperature. That is, heat may be applied to the part until the part's temperature reaches the processing temperature.

In some embodiments, the processing temperature is less than the solidus temperature of an interlayer and a core layer. For example, a furnace may be configured to set the processing temperature to be 5° C. to 100° C. below the solidus temperature of the interlayer.

In some embodiments, the part(s) may be in a heated press during the homogenization process to increase or improve heat transfer to the part. Well-controlled heat transfer may allow the part to be heated more evenly and consistently during the processing phase, allowing fine control over the rate at which elements diffuse in the part without the part melting. This improves the rate of diffusion and reduces the chance of defects forming in the part.

FIG. 4C illustrates a foil or part 406 that is manufactured by stacking foils such as the foils 400a or 400b. For example, part 406 is seen as including a plurality of core layers 402c and a plurality of interlayers 404c.

During the homogenization process, a foil such as foils 400a—c is held at the processing temperature for a period of time to allow the elements in the interlayer(s) and core layer(s) to interdiffuse, thereby forming a roughly uniform composition in both regions. This interdiffusion process involves two concurrent phenomena. That is, elements that are present in the interlayer(s) diffuse into the core layer region, and elements that are present in the core layer diffuse into the interlayer region. As the thickness of the core layer may be at least a multiple greater than that of the interlayer(s), the slowest diffusing element is a component present in at least one of the core layer and interlayer that diffuses into the complementary layer.

Additionally, elements with a lower diffusion coefficient diffuse more slowly at the same concentration gradient, temperature, and at other environmental conditions than elements with a higher diffusion coefficient. The slowest diffusing element is therefore the element with the lowest diffusion coefficient. The foil may be considered homogenized once the slowest diffusing element is present in both the regions previously occupied by the core layer and interlayer(s), and the peak composition of the slowest diffusing element is within the standard tolerances for alloy composition in published standards, such as specified TEAL sheets.

FIG. 4D illustrates a part 408 produced from a homogenization process in accordance with one embodiment. As seen in FIG. 4D, the part 408 has at least a portion that is fully homogenized and uniform in composition.

Figure 5:
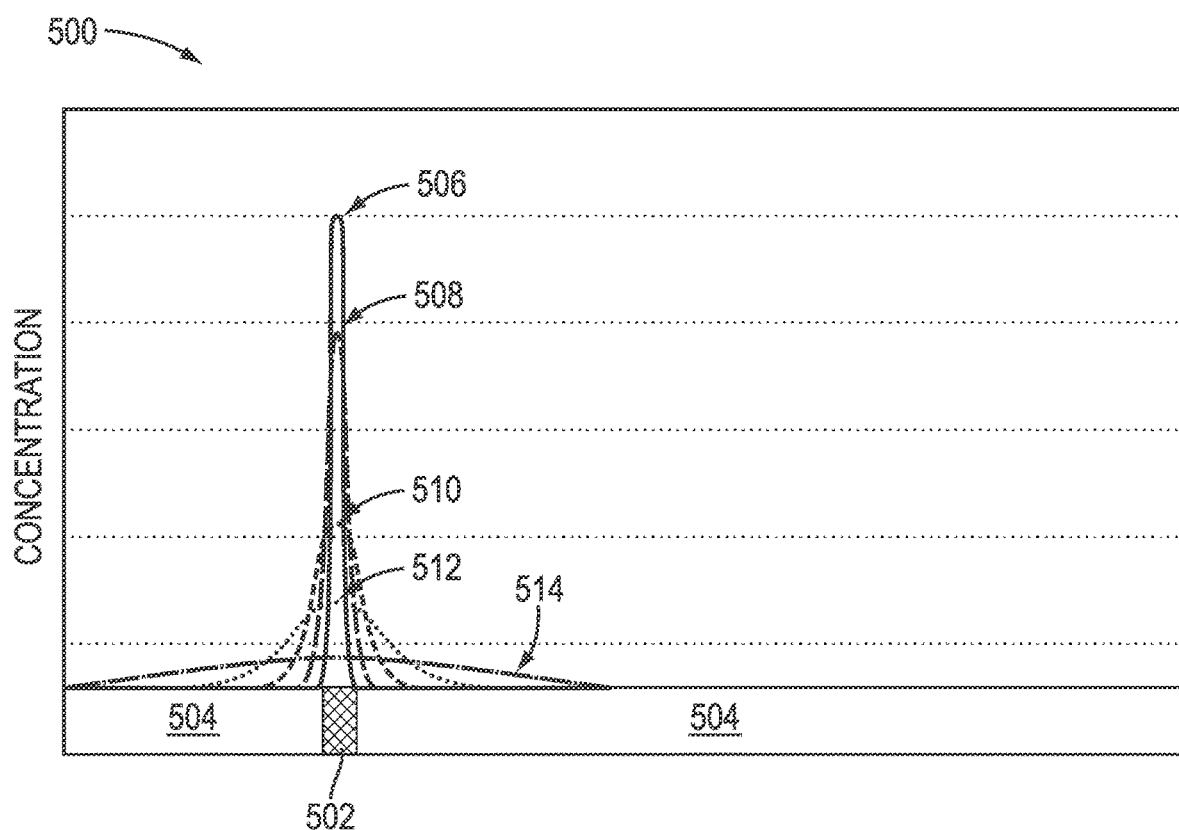
FIG. 5 illustrates a concentration profile of an interface between an interlayer and two core layers in accordance with one embodiment.

FIG. 5 illustrates a concentration profile 500 of an interface encompassing interlayer 502 and bordering two core layers 504 as a function of time during the homogenization process. In this example, there is initially (i.e., before a homogenization process begins) an alloying element that is present in the interlayer 502 but is not present in either of the core layers 504.

Series 506 represents the initial concentration of this alloying element before the homogenization process begins. As seen in FIG. 5, the concentration of this alloying element in the interlayer 502 is high, but is zero in the core layers 504. That is, the composition of the core layers 504 does not include the alloying element before the homogenization process begins.

The three progressive series 508, 510, and 512 represent the concentration of the alloying element at different times throughout the homogenization process. Series 508 represents the alloying element concentration at time t1, series 510 represents the alloying element concentration at time t2, and series 512 represents the alloying element concentration at time t3, where t1<t2<t3. From t1-t3, the composition of alloying element in interlayer 502 decreases as it is being diffused out of the area previously occupied by the interlayer 502. As this occurs, the composition of the alloying element in the core layers 504 increases. Series 514 represents the concentration of the alloying element at the end of the homogenization process. As seen in profile 500, the concentration of the alloying element has decreased in the interlayer 502 and has increased in the core layers 504.

Figure 6:
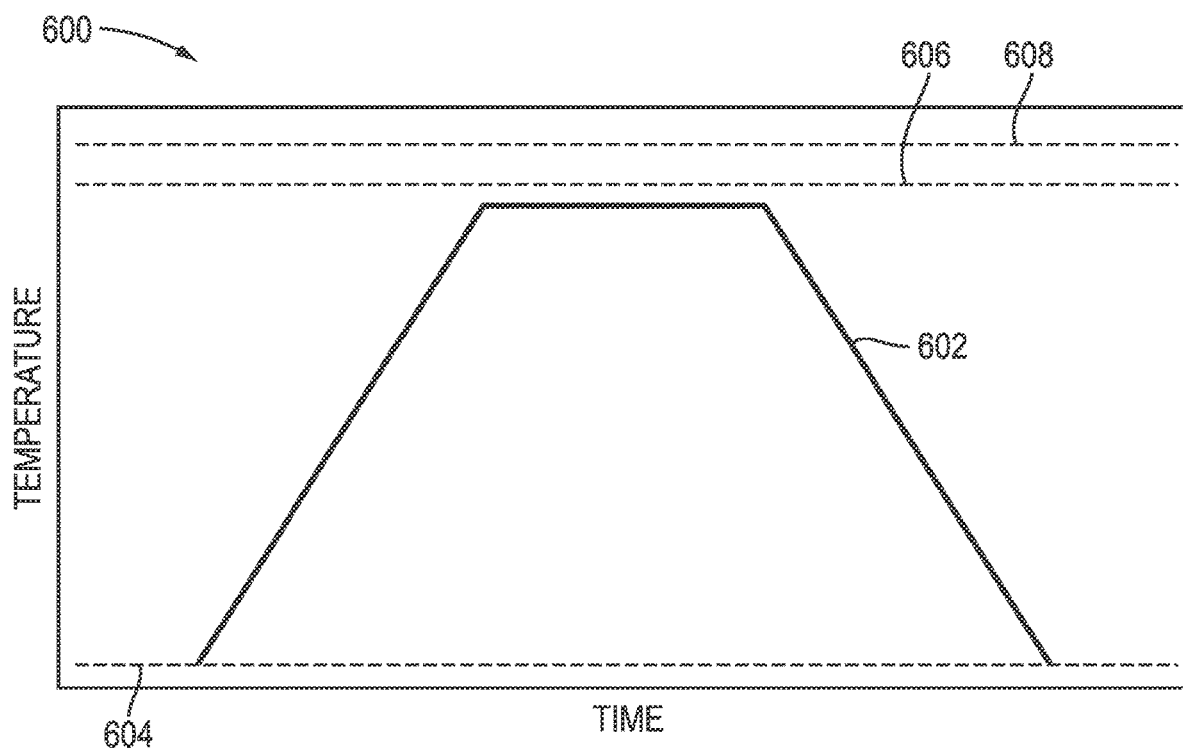
FIG. 6 illustrates an operating profile of a homogenization process in accordance with one embodiment.

FIG. 6 illustrates an operating profile 600 for a homogenization process as a function of time in accordance with one embodiment. The homogenization process associated with the profile 600 of FIG. 6 may be similar to the process described in conjunction with FIG. 5, for example.

The temperature 602 is initially at room or ambient temperature 604 before the homogenization process begins. The temperature 602 may be heated to a temperature that is below the interlayer solidus temperature 606. The interlayer solidus temperature 606 is less than the core layer solidus temperature 608.

The time required for the homogenization process is partly determined by the thicknesses of the core layer and the interlayer. For example, the time required for the homogenization process scales with the thickness of the layers. Specifically, foils with thinner interlayers require less time to homogenize.

Similarly, the rate at which diffusing elements move is increased with increased temperature. The time required for the homogenization process is therefore also a function of temperature and is reduced as the processing temperature is increased.

After some period of time that is sufficient to facilitate the homogenization process, the temperature 602 may be reduced back to the room or ambient temperature 604. The cooling phase may involve quenching the part in water, oil, or another fluid; using fans or otherwise by blowing air to cool the part, cooling naturally, or the like.

Figure 7:
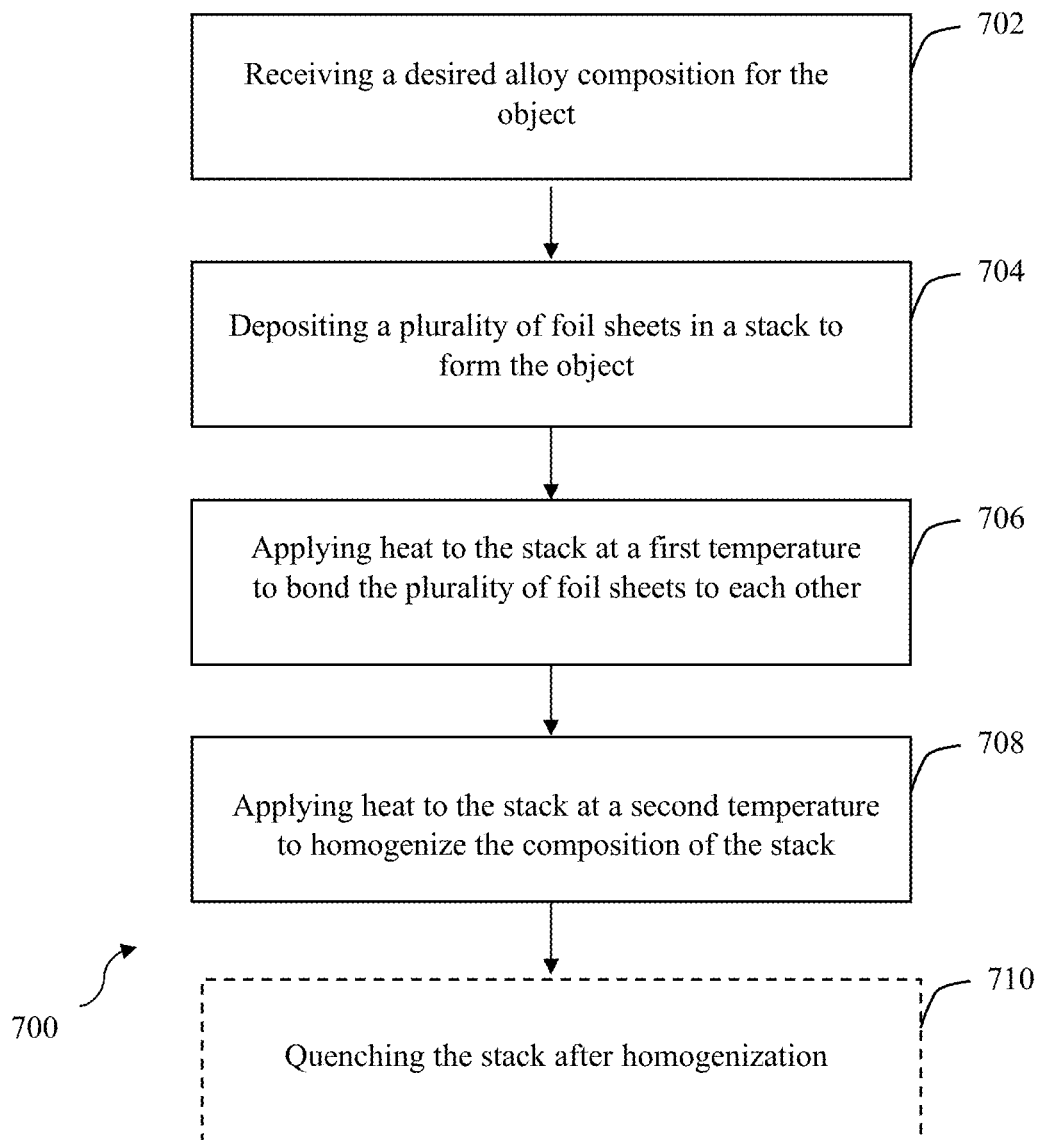
FIG. 7 depicts a flowchart of a method for the manufacturing of an object in accordance with one embodiment.

FIG. 7 depicts a flowchart of a method 700 for the manufacturing of an object in accordance with one embodiment. Homogenized parts produced from two or more different component alloys may exhibit mechanical properties that are superior to any of the constituent alloys. In some instances, the composition of the alloys that are selected for the component layers may have weaker mechanical properties than the final homogenized part.

For example, the core layer and the interlayer(s) may alternatively comprise a greater fraction of magnesium and silicon than the stoichiometric ratio of 2:1. This ratio would typically produce a weak, pliable material. However, the overall fractions of magnesium and silicon are present in a ratio such that the homogenized part is a high strength, hardened 6000-series alloy with a magnesium-to-silicon ratio to meet a desired alloy composition. This allows alloys to have their processing conditions such as melting temperatures fine-tuned by the selective presence of magnesium and silicon without the negative consequences of an excess of one of those elements in the final, homogenized part.

Step 702 involves receiving a desired alloy composition for the object. The desired alloy composition may be a copper-rich aluminum alloy in the 2000 series, silicon-rich aluminum alloy in the 4000 series, a magnesium-rich aluminum alloy in the 5000 series, a magnesium and silicon-rich aluminum alloy in the 6000 series, a zinc-rich aluminum alloy in the 7000 series, etc.

Step 704 involves depositing a plurality of foils in a stack to form the object. The type(s) of foils deposited in a stack as part of step 704 may depend on the desired alloy composition specified in step 702.

For example, if the desired alloy composition is an aluminum alloy in the 6000 series, then core layers of 6000-series alloys and interlayers of 2000-series alloys may be employed. In this case, the copper from the copper-rich 2000-series interlayer would diffuse into the core layer of the 6000-series alloy, producing a low-copper 6000-series alloy such as 6061, which is a high-strength machining alloy.

If the desired alloy composition is a magnesium-rich aluminum alloy in the 5000 series, then core layers of 1000-, 3000-, or 1000-series alloys and interlayers of 5000 series alloys may be employed. If the desired alloy composition is a silicon-rich aluminum alloy in the 4000 series, then core layers of 6000-series alloys and interlayers of 4000-series alloys may be employed. If the desired alloy composition is a zinc-rich aluminum alloy in the 7000 series, core layers of at least one of 2000-, 5000-, 6000-, or 7000-series alloys and interlayers of 7000-series alloys may be employed.

In some embodiments, where the homogenized part is an aluminum alloy of the X000 series, both the interlayer and core layers may be alloys of the same X000 series. In other embodiments, where the homogenized part is an aluminum alloy of the X000 series, both the interlayer and core layer may be custom alloys that match the composition of the X000 series, except one of the core layer or interlayer has an excess of at least one element, and the complementary alloy has a deficit of at least one of the same element.

In some embodiments, the composition of individual foil layers in the stack can be selected such that, when diffused using the foregoing processes, the result is an object having a homogenous composition that matches a desired composition that is non-identical to that of the constituent foils. The following tables identify several alloys as well as the constituent foils that can be used to achieve those alloys.

TABLE 1

Desired alloy is a 6000-series aluminum alloy (all compositions in wt %)

|  | Si | Fe | Cu | Mn | Mg | Cr | Zn | Ti |
|---|---|---|---|---|---|---|---|---|
| Core | 0.5-0.7 | <0.3 | <0.1 | <0.1 | 0.9-1.1 | 0.04-0.35 | <0.25 | <0.15 |
| Clad | 0.8-1.6 | <0.3 | 1.5-2.7 | <0.1 | 0.4-1.1 | 0.04-0.35 | <0.25 | <0.15 |

TABLE 2

Desired alloy is a 6000-series aluminum alloy (all compositions in wt. %)

|  | Si | Fe | Cu | Mn | Mg | Cr | Zn | Ti |
|---|---|---|---|---|---|---|---|---|
| Core | 0.2-0.3 | <0.3 | 0.15-0.4 | <0.1 | 0.9-1.1 | 0.04-0.35 | <0.25 | <0.15 |
| Clad | 1.3-1.7 | <0.3 | 0.15-0.4 | <0.1 | 0.9-1.1 | 0.04-0.35 | <0.25 | <0.15 |

TABLE 3

Desired alloy is a 6000-series aluminum alloy (all compositions in wt. %)

|  | Si | Fe | Cu | Mn | Mg | Cr | Zn | Ti |
|---|---|---|---|---|---|---|---|---|
| Core | 0.1-0.2 | <0.35 | <0.1 | <0.1 | 0.25-0.45 | <0.1 | <0.1 | <0.1 |
| Clad | 0.8-1.0 | <0.35 | <0.1 | <0.1 | 1.0-1.3 | <0.1 | <0.1 | <0.1 |

TABLE 4

Desired alloy is a 6000-series aluminum alloy (all compositions in wt. %)

|  | Si | Fe | Cu | Mn | Mg | Cr | Zn | Ti |
|---|---|---|---|---|---|---|---|---|
| Core | 0.5-0.7 | <0.5 | <0.1 | 0.4-1.0 | 0.7-0.9 | <0.25 | <0.2 | <0.1 |
| Clad | 1.3-1.5 | <0.5 | <0.1 | 0.4-1.0 | 0.5-0.7 | <0.25 | <0.2 | <0.1 |

TABLE 5

Desired alloy is a 2000-series aluminum alloy (all compositions in wt. %)

|  | Si | Fe | Cu | Mn | Mg | Cr | Zn | Ti |
|---|---|---|---|---|---|---|---|---|
| Core | 0-0.25 | <0.3 | 3.5-3.8 | 0.3-0.9 | 1.2-1.8 | <0.1 | <0.25 | <0.15 |
| Clad | 0.4-0.7 | <0.3 | 4.8-5.2 | 0.3-0.9 | 1.2-1.8 | <0.1 | <0.25 | <0.15 |

TABLE 6

Desired alloy is a 2000-series aluminum alloy (all compositions in wt. %)

|  | Si | Fe | Cu | Mn | Mg | Cr | Zn | Ti |
|---|---|---|---|---|---|---|---|---|
| Core | 0.1-0.6 | <0.7 | 3.75-4.25 | 0.4-1.2 | 0.2-0.8 | <0.1 | <0.25 | <0.15 |
| Clad | 1.0-1.8 | <0.7 | 4.2-5.5 | 0.4-1.2 | 0.8-1.4 | <0.1 | <0.25 | <0.15 |

TABLE 7

Desired alloy is a 7000-series aluminum alloy (all compositions in wt. %)

|  | Si | Fe | Cu | Mn | Mg | Cr | Zn | Ti |
|---|---|---|---|---|---|---|---|---|
| Core | <0.1 | <0.5 | 1.0-1.3 | <0.3 | 1.9-2.1 | 0.18-0.28 | 5.0-5.4 | <0.15 |
| Clad | 0.5-0.7 | <0.5 | 2.0-2.4 | <0.3 | 2.8-3.0 | 0.18-0.28 | 5.8-6.2 | <0.15 |

TABLE 8

Desired alloy is a 7000-series aluminum alloy (all compositions in wt. %)

|  | Si | Fe | Cu | Mn | Mg | Cr | Zn | Ti |
|---|---|---|---|---|---|---|---|---|
| Core | <0.12 | <0.15 | 1.6-2.0 | <0.1 | 1.5-1.9 | <0.04 | 5.4-5.7 | <0.15 |
| Clad | <0.12 | <0.15 | 3.0-3.2 | <0.1 | 2.8-3.2 | <0.04 | 6.5-7.0 | <0.15 |

TABLE 9

Desired alloy is a 7000-series aluminum alloy (all compositions in wt. %)

|  | Si | Fe | Cu | Mn | Mg | Cr | Zn | Ti |
|---|---|---|---|---|---|---|---|---|
| Core | <0.06 | <0.08 | 1.0-1.6 | <0.4 | 0.9-1.3 | <0.04 | 6.6-7.0 | <0.06 |
| Clad | <0.06 | <0.08 | 1.8-2.2 | <0.4 | 1.4-2.0 | <0.04 | 8.0-8.6 | <0.06 |

TABLE 10

Desired alloy is a 300-series aluminum alloy (all compositions in wt. %)

|  | Si | Fe | Cu | Mn | Mg | Cr | Zn | Ti |
|---|---|---|---|---|---|---|---|---|
| Core | 7.0-7.5 | <1.3 | 2.6-3.0 | <0.5 | <0.1 | — | 1.0-1.5 | — |
| Clad | 10.0-11.0 | <1.3 | 4.25-4.75 | <0.5 | <0.1 | — | 2.0-2.5 | — |

Each table specifies the different compositions of the core layer and the cladding layer (i.e., an interlayer), while the table label specifies the desired alloy series. The number entries correspond to the weight fractions of each of the major alloying elements, with the balance being aluminum (Al). These above compositions are merely exemplary and other compositions may be achieved in accordance with the embodiments herein.

The foils may be clad on one or both sides, and the total thickness of the foil may be between 25 μm and 1,000 μm. The core layer thickness is typically greater than the interlayer thickness. In some embodiments the foils are "all core" or "all clad" for each example. In these embodiments, the foils may be alternated to create the same striated layer structure of alternating core and clad layers as can be generated with a stack of cladded foils.

Step 706 involves applying heat to the stack at a first temperature to bond the plurality of foils to each other. The stack may comprise a foil of a plurality of layers. Each layer may comprise, for example, an aluminum alloy, a magnesium alloy, or a titanium alloy. The alloying material may be aluminum, chromium, copper, lithium, magnesium, manganese, titanium, nickel, silicon, or zinc. The first temperature that is required to bond the foils together may depend on the material(s) used.

Step 708 involves applying heat to the stack at a second temperature to homogenize the composition of the stack. As discussed previously, the stack (e.g., a foil) may be heated to achieve a desired level of interdiffusion. In some embodiments, the second temperature is less than the melting points of the plurality of foils. In some embodiments, the second temperature may be approximately the solidus temperature of the plurality of foils or of the desired alloy composition. In some embodiments, the second temperature may be the same as the first temperature.

Step 710 is optional and involves quenching the stack after homogenization. This quenching step may occur in the same processing unit in which the homogenization step occurs or may occur in a location other than the processing unit in which the homogenization step occurs. The optional quenching step may be employed depending on the desired alloy properties.

Figure 8:
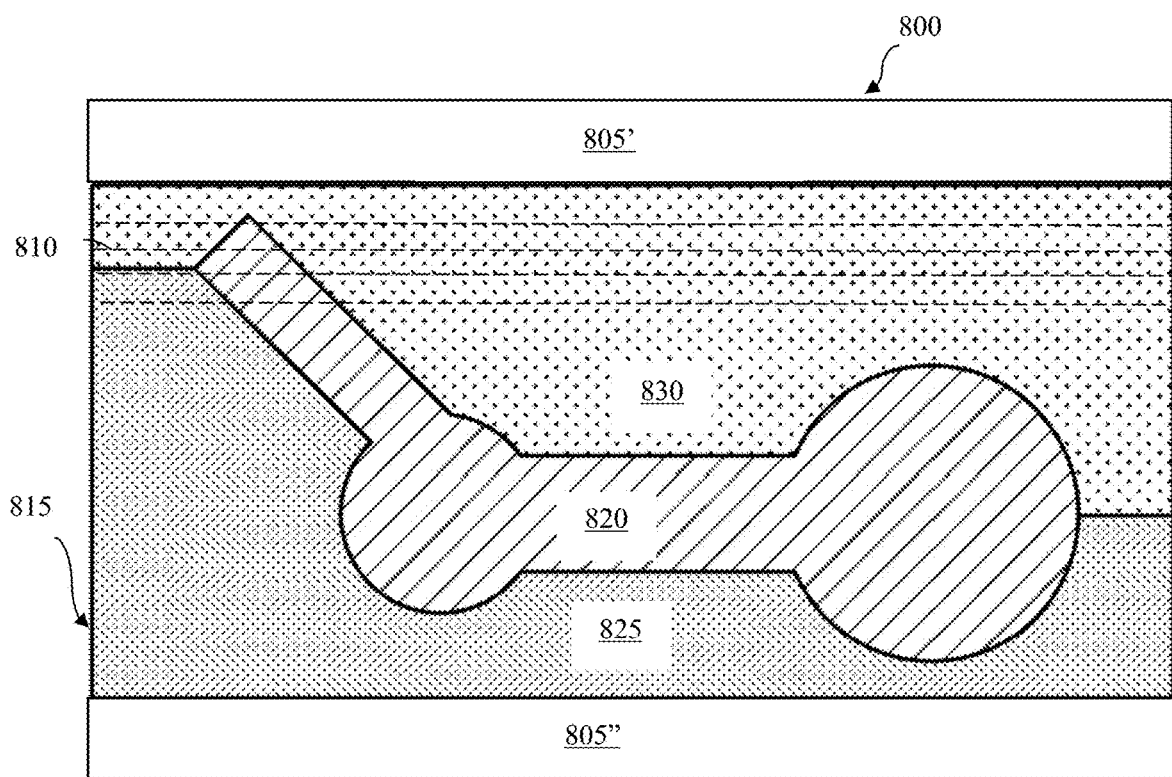
FIG. 8 depicts an additive manufacturing system comprising two plates configured to apply at least one of heat and pressure to layer stack to join layers in the layer stack in accordance with one embodiment.

FIG. 8 depicts an additive manufacturing system 800 comprising two plates 805', 805" (collectively "805") configured to apply at least one of heat and pressure to a layer stack 815 to join foils 810 in accordance with one embodiment. Some embodiments may use at least one bonding method to join at least two foils 810 within a layer stack 815.

In some embodiments, the platens 805 may be at least one of pressurized or heated plates. In some embodiments, the platens 805 may be configured to apply at least one of heat or pressure to opposite sides of the layer stack 815. In some embodiments, applying the at least one of heat or pressure increases the temperature of the layer stack 815 to a temperature lower than the melting temperature of the core layer of the foils 810, such that the at least one of heat or pressure bonds the first foil to the second foil in the layer stack 815.

In some embodiments, to bond the object region 820, the plates 805 may apply even pressure to the layer stack 815. In some embodiments, the layer stack 815 may comprise a full encasing of the object region 820. The full encasing may comprise at least two support regions 825, 830, such that the object region 820 is fully enclosed in the support regions 825, 830.

In some embodiments, the support regions 825, 830 are configured to conduct at least one of heat or pressure through the layer stack 815 from the plates 805. This conduction of heat or pressure promotes bonding of the foils 810 to form a bonded object region 820. In some embodiments, the plates 805 apply at least one of heat or pressure to the support regions 825, 830, which in turn conduct the at least one of heat or pressure to the object region 820. In some embodiments, the support regions 825, 830 may have flat surfaces, such that the plates 805 may evenly apply at least one of pressure or heat across the entire surface. In some embodiments, the support region is a singular support region surrounding the object region 820 and may be used to create a negative of an object. In some embodiments, the bonding process of the object region 820 may occur under oxidizing atmospheres, such as air. In some embodiments, the bonding process of the foils 810 may be enclosed in a vacuum or inert gas chamber.

In some embodiments, the system may employ at least one of diffusion bonding, transient liquid diffusion bonding, and/or brazing. In some embodiments, the alloy composition and processing conditions are optimized for efficient diffusion bonding.

Figure 9:
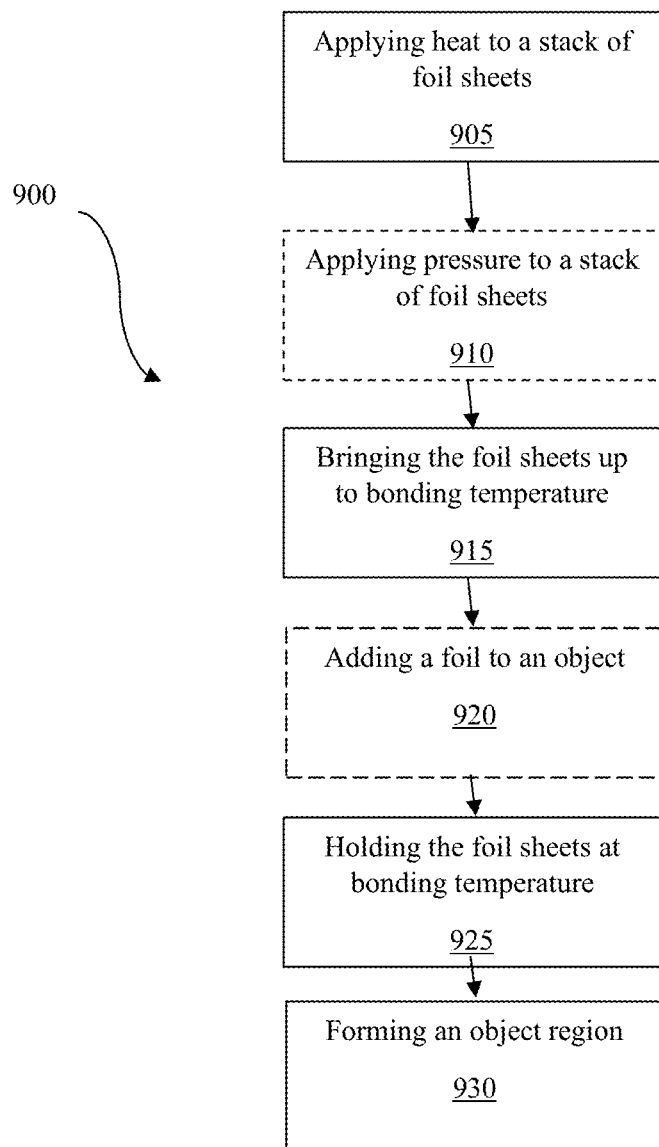
FIG. 9 schematically shows a method for the additive manufacturing of an object through diffusion bonding in accordance with one embodiment.

FIG. 9 schematically shows a method 900 for the additive manufacturing of an object through diffusion bonding in accordance with one embodiment. The method 900 comprises applying heat to the stack of foils to bring the foils to a bonding temperature (Step 905). In some embodiments, bonding temperature may be less than the melting temperature of the core layer of the foils and high enough to promote diffusion and bonding between adjacent foils. In some embodiments, the bonding temperature may be less than the temperature of the interlayer of the foils. In some embodiments, at least one plate may apply heat to the foils.

In some embodiments, the stack of foils may be brought up to bonding temperature and optional pressure (Step 915) and held at the bonding temperature and optional pressure (Step 925) until the elements from adjacent core layers diffuse into each other, joining the stack of foils into an object region (Step 930).

In some embodiments, the method may comprise a sequential diffusion bonding process. In a sequential diffusion bonding process, the method may comprise adding a foil to an object or part of an object at the bonding temperature (Step 920). In some embodiments, the bonding temperature may be less than the melting temperature of the core layer material. Alternatively, the foil may be added to a cold foil stack and the stack with the additional foil may be brought to bonding temperature. In some embodiments, a foil is added to an already heated stack and the pressure is applied to the stack. In some embodiments, after the pressure is applied, the pressure is relaxed to add another foil (Step 920).

In some embodiments, the temperature may promote diffusion and bonding between the elements of the core layer of the added foil and the object, causing the bonding process to occur.

In some embodiments, at least one of the object or a component thereof may serve as a heat sink. In some embodiments, the heat sink may generate a temperature gradient across the object for the purpose of selectively promoting diffusion bonding in one sub-region of the object. In some embodiments, the diffusion process may be repeated until the object is completed.

Figure 10:
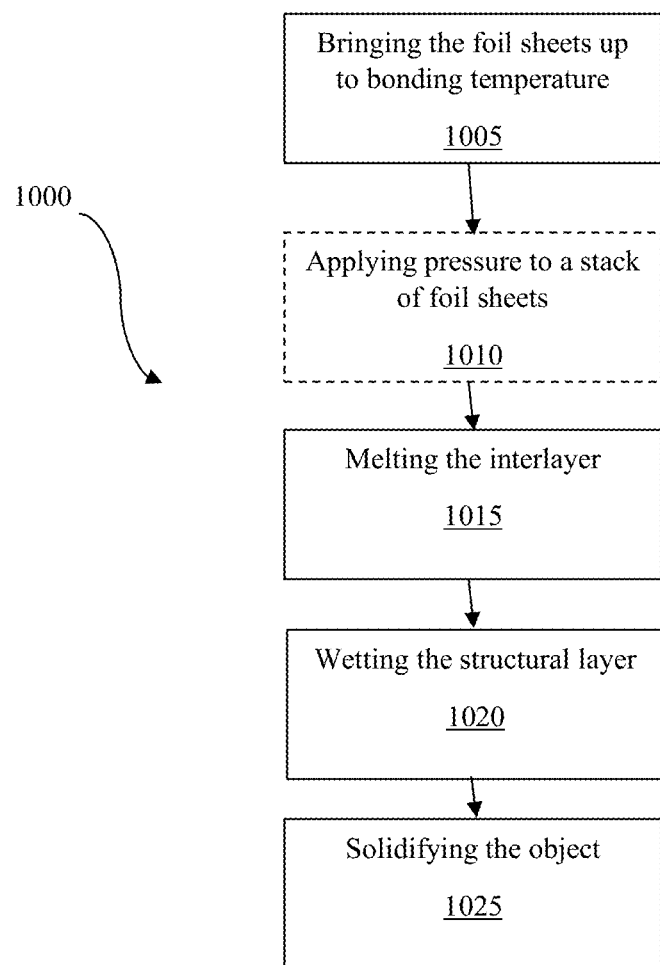
FIG. 10 schematically shows a method for the additive manufacturing of an object through transient liquid phase (TLP) diffusion bonding in accordance with one embodiment.

FIG. 10 schematically shows a method 1000 for additive manufacturing of an object through transient liquid phase (TLP) diffusion bonding in accordance with one embodiment. Some embodiments may optimize the alloy composition and processing conditions for efficient bonding through transient liquid phase (TLP) diffusion bonding under an oxidizing or non-oxidizing atmosphere, or a vacuum.

In some embodiments, the core material is aluminum or an aluminum alloy. In some embodiments, the core material may comprise at least one of aluminum, magnesium, titanium, copper, silicon, or zinc. The alloying elements may comprise at least one of magnesium or zinc. In some embodiments, the cladding interlayer may comprise at least one of an aluminum-magnesium alloy, a magnesium-zinc alloy, an alloy of at least two of aluminum, copper, magnesium, silicon, or zinc, or any combination thereof. In some embodiments, at least one of these interlayer alloying elements may serve as an oxide getter, preferentially binding to oxygen at a greater rate than aluminum.

In some embodiments, the aluminum alloy foil may comprise between 20% and 100% aluminum. In some embodiments, the aluminum alloy foil may comprise at least one of Sb, Ba, Be, Bi, B, Cd, Ca, C, Cr, Co, Cu, Ga, Fe, Pb, Li, Mg, Mn, Ni, O, P, K, Sc, Si, Ag, Na, Sr, Sn, Ti, V, Zn, or Zr. In some embodiments, the aluminum alloy foil may comprise more than 50% Cu. In some embodiments, the aluminum alloy foil may comprise more than 40% Fe. In some embodiments, the aluminum alloy foil may comprise more than 40% Mg. In some embodiments, the aluminum alloy foil may comprise more than 40% Ni. In some embodiments, the aluminum alloy foil may comprise more than 40% Zn. In some embodiments, the aluminum alloy foil may comprise more than 60% Si.

In some embodiments, the magnesium alloy foil may comprise between 45% and 100% magnesium. In some embodiments, the magnesium alloy foil may comprise at least one of Al, Be, Ca, Ch, Cu, Gd, Fe, Li, Mn, Nd, Ni, Si, Ag, Th, Y, Zn, Zr, or rare earth metals. In some embodiments, the magnesium alloy foil may comprise more than 40% Al.

In some embodiments, the titanium alloy foil may comprise between 70% and 100% titanium. In some embodiments, the titanium alloy foil may comprise at least one of Al, B, C, Cr, Cu, H, Fe, Mn, Mo, Ni, Nb, N, O, Pd, Si, S, Ta, Sn, V, Y, or Zr.

In some embodiments, the melting temperature of the interlayer may be at least 10° C. less than the melting temperature of the core layer. The melting temperature of the interlayer may be minimized to reduce energy cost and machine complexity of processing. In some embodiments, the melting temperature of the interlayer may be below 500° C.

In some embodiments, the overall foil thickness is generally between 25 µm and 1000 µm. Each interlayer may be up to 50% of the thickness of the core material and may be between 1 µm and 50 µm thick. The interlayer material may be deposited on either one or both sides of the core material to form a single foil.

In some embodiments, methods may use diffusing elements comprising at least one of Cu, Mg, Zn, or Si. In some embodiments, the interlayer may comprise at least 0.2% Cu. In some embodiments, the diffusing element may comprise at least 1% Cu. In some embodiments, the diffusing element may comprise at least 2% Cu. In some embodiments, the diffusing element may comprise a maximum of 4% Cu. In some embodiments, the diffusing element may comprise a maximum of 5% Cu. In some embodiments, the diffusing element may comprise a maximum of 6% Cu. In some embodiments, the diffusing element may comprise a maximum of 6.3% Cu.

In some embodiments, the method comprises bringing the stack of foils up to bonding temperature (Step 1005), which is greater than the melting temperature of the interlayer but less than the melting temperature of the core layer of the constituent foils.

In some embodiments, the method may comprise compressing the stack of foils by applying pressure (Step 1010). In some embodiments, the pressure may be on the order of 0.1-100 MPa.

In some embodiments, applying at least one of temperature or pressure may cause interlayer to melt, increasing the rate of diffusion of the elements of the core layer into the interlayer, and the elements of the interlayer into the core layer (Step 1015). In some embodiments, applied pressure may promote mixing of the elements between the core layers and interlayers of adjacent foils.

In some embodiments, as the elements of the interlayers and core layer interdiffuse, the average composition of the stacked foils changes to resemble the final average composition of the object, and the melting temperature increases corresponding to the composition change. In some embodiments, new bonds are formed between metallic components.

In some embodiments, this process can be accomplished sequentially. In a sequential process, a foil may be added to a part at the bonding temperature, which is greater than the melting temperature of the interlayer material, or a new foil may be added to a cold stack which is then brought up to bonding temperature. In some embodiments, the interlayer of the added foil may melt (Step 1015) to continue the bonding process.

In some embodiments, previously deposited layers are not affected by this process, as their constituent interlayers have already inter-diffused with the core layers, and bonded so that the part will not melt at the applied bonding temperature.

Figure 11:
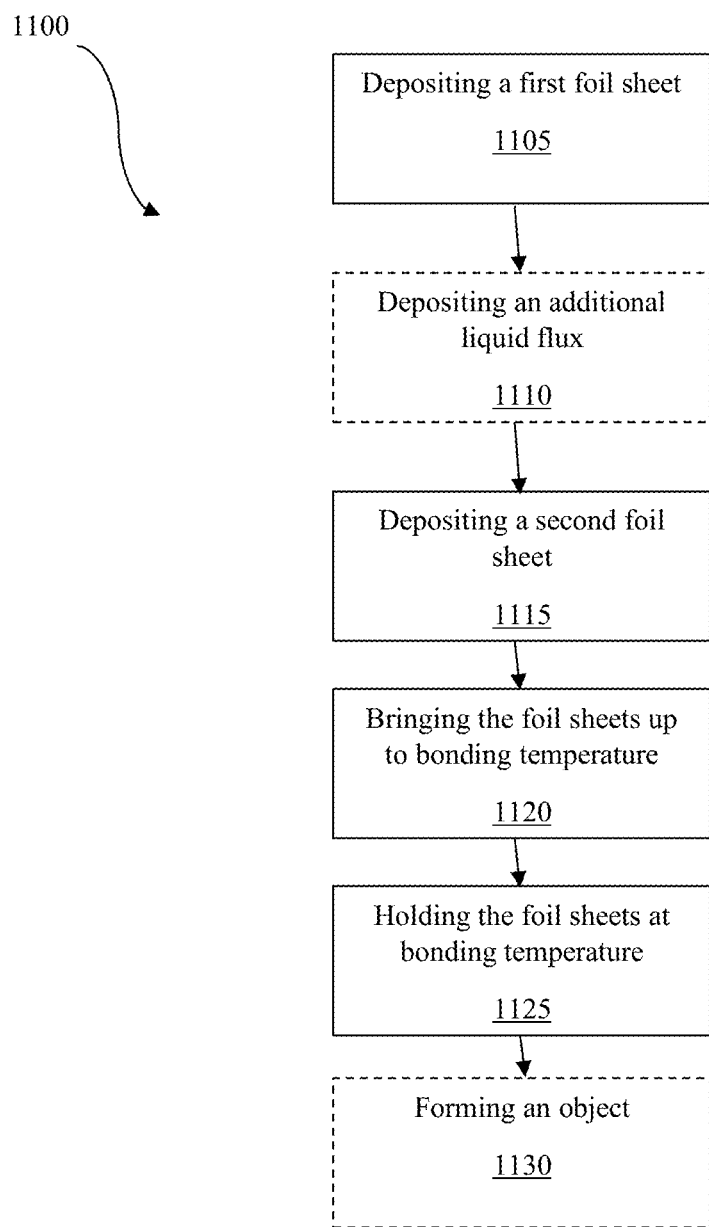
FIG. 11 schematically shows a method for the additive manufacturing of an object through brazing in accordance with one embodiment.

FIG. 11 schematically shows a method 1100 for additive manufacturing of an object through brazing in accordance with one embodiment. In some embodiments, brazing is used to optimize the alloy composition and processing conditions for bonding.

In some embodiments, the method comprises depositing a first foil (Step 1105). In some embodiments, the first foil may be deposited onto a print bed. In some embodiments, the first foil may be deposited onto a foil. In some embodiments, the method further comprises depositing a second foil (Step 1115). In some embodiments, the foils may comprise at least one interlayer and at least one core layer.

In some embodiments, the foils may be brought up to the bonding temperature (Step 1120). In some embodiments, bonding temperature is greater than the melting temperature of the interlayer but less than the melting temperature of the core layer of the foils.

In some embodiments, the foils may be held at this bonding temperature for a fixed period of time (Step 1125). In some embodiments, holding the foils at a bonding temperature may allow the interlayers to melt, which increases the rate of diffusion of the elements of the core layer into the interlayer, and correspondingly the elements of the interlayer into the core layer.

This process causes the formation of metallic bonds between the adjacently stacked foils, forming an object (Step 1130).

In some embodiments, the brazing process may be accomplished sequentially. In a sequential brazing process, a foil may be added to a sub-assembly or object comprising several bonded foils. In some embodiments, an additional liquid flux may be applied to the void space between the added foil and the object.

In some embodiments, the added foil and the part may be brought up to the bonding temperature, which is greater than the melting temperature of the interlayer of the added foil but less than the melting temperature of the core layer of the added foil, as well as the less than the melting temperature of the alloy that makes up the part (Step 1120).

In some embodiments, the added foil and the part may be held at this bonding temperature for a fixed period of time (Step 1125), which melts the interlayer of the added foil and the bonding process described above occurs.

In some embodiments, the previously deposited layers may not be affected by this process, as their constituent interlayers have already melted, inter-diffused with the core layers, and bonded so that the object will not melt at the applied bonding temperature.

In some embodiments the alloy compositions of the core layer and interlayer could be used in other form factors, such as core-structured powders or core-structured wires, or a combination of two powder compositions. These could then be bonded and when diffused using the foregoing processes, the result is an object having a homogenous composition that matches a desired composition that is non-identical to that of the constituent inputs.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

What is claimed is:

1. A method for manufacturing of an object, the method comprising:
   receiving a desired alloy composition for the object;
   depositing a plurality of foils having at least two constituent compositions in a stack to form the object;
   applying heat to the stack at a first temperature to bond the plurality of foils to each other; and
   applying heat to the stack at a second temperature to homogenize the composition of the stack,
   wherein the homogenized stack has the desired alloy composition.

2. The method of claim 1, wherein the plurality of foils are patterned.

3. The method of claim 1, wherein the plurality of foils comprises sheets having at least two different compositions.

4. The method of claim 1, wherein each foil comprises a plurality of layers.

5. The method of claim 4, wherein each layer comprises an aluminum alloy, a magnesium alloy, or a titanium alloy.

6. The method of claim 1, wherein at least one of the constituent compositions comprises at least one of aluminum, chromium, copper, lithium, magnesium, titanium, nickel, silicon, and zinc.

7. The method of claim 4, wherein a first layer forms a core of the foil and a second layer forms a cladding of the foil.

8. The method of claim 1, wherein each foil is between 25 and 1000 micrometers in thickness.

9. The method of claim 1, wherein the second temperature is less than the melting points of the plurality of foils.

10. The method of claim 1, wherein each of the constituent compositions has a solidus temperature, and wherein the second temperature is approximately the same as or less than the lowest solidus temperature of the constituent compositions.

11. The method of claim 1, wherein the first temperature and the second temperature are the same.

12. The method of claim 1, wherein the application of heat at the first temperature occurs in a first processing unit and the application of heat at the second temperature occurs in a second processing unit.

13. The method of claim 12, wherein the stack is maintained at the first temperature during transfer from the first processing unit to the second processing unit.

14. The method of claim 1, further comprising quenching the stack after homogenization.

15. The method of claim 12, wherein the quenching occurs in the second processing unit used for homogenizing the stack.

16. The method of claim 1, wherein pressure is applied to the stack during the application of heat at the first temperature, the application of heat at the second temperature, or both.

17. The method of claim 1, wherein the desired alloy composition is a homogenous composition that is non-identical to that of the plurality of foils.

* * * * *